United States Patent [19]

Bergstén

[11] Patent Number: 5,009,328

[45] Date of Patent: Apr. 23, 1991

[54] ARTICLE CASSETTE FOR A VENDING MACHINE

[76] Inventor: Curt A. Bergstén, Bärnstensgatan 14, Helsingborg, Sweden, S-253 68

[21] Appl. No.: 359,659

[22] PCT Filed: Nov. 24, 1987

[86] PCT No.: PCT/SE87/00555

§ 371 Date: Jul. 20, 1989

§ 102(e) Date: Jul. 20, 1989

[87] PCT Pub. No.: WO88/04086

PCT Pub. Date: Jun. 2, 1988

[30] Foreign Application Priority Data

Nov. 24, 1986 [SE] Sweden .......................... 86 05013-5

[51] Int. Cl.$^5$ .............................................. B65G 59/00

[52] U.S. Cl. .................................... 221/152; 221/230; 221/226; 221/243; 221/244; 221/248; 221/251; 221/279

[58] Field of Search ............................... 221/151-153, 221/155, 243, 244, 247, 248, 249, 251, 253, 255, 279, 224, 226, 230, 124, 125, 129, 191, 195; 312/71, 97

[56] References Cited

U.S. PATENT DOCUMENTS

| | | | |
|---|---|---|---|
| 1,572,263 | 2/1926 | Ash | 221/230 |
| 2,460,396 | 2/1949 | Rifkin | 221/279 |
| 2,513,595 | 7/1950 | Stewart | 221/125 |
| 2,521,458 | 9/1950 | Huheey et al. | 221/151 X |
| 2,522,896 | 9/1950 | Rifkin et al. | 221/279 X |
| 2,561,828 | 7/1951 | Springsteen . | |
| 4,577,780 | 3/1986 | Holland et al. | 221/251 X |

FOREIGN PATENT DOCUMENTS

| | | |
|---|---|---|
| 2389946 | 5/1977 | Fed. Rep. of Germany . |
| 433678 | 6/1984 | Sweden . |

*Primary Examiner*—David H. Bollinger
*Attorney, Agent, or Firm*—Fleit, Jacobson, Cohn, Price, Holman & Stern

[57] ABSTRACT

An article cassette for a vending machine has a horizontal conveyor for supporting articles one behind another in a row behind an outfeed station and for feeding the articles step by step towards the outfeed station. The outfeed station at its forward end has an access opening provided with a cover mounted for rotation between a closed position and an opened position. In the opened position the cover provides access to the outfeed station for removal of an article therefrom. The cover also carries a screen for blocking off the outfeed station from the conveyor when the cover is opened, the screen being in the form of an extension at one end of the cover.

10 Claims, 2 Drawing Sheets

Figures 1, 3, 4:
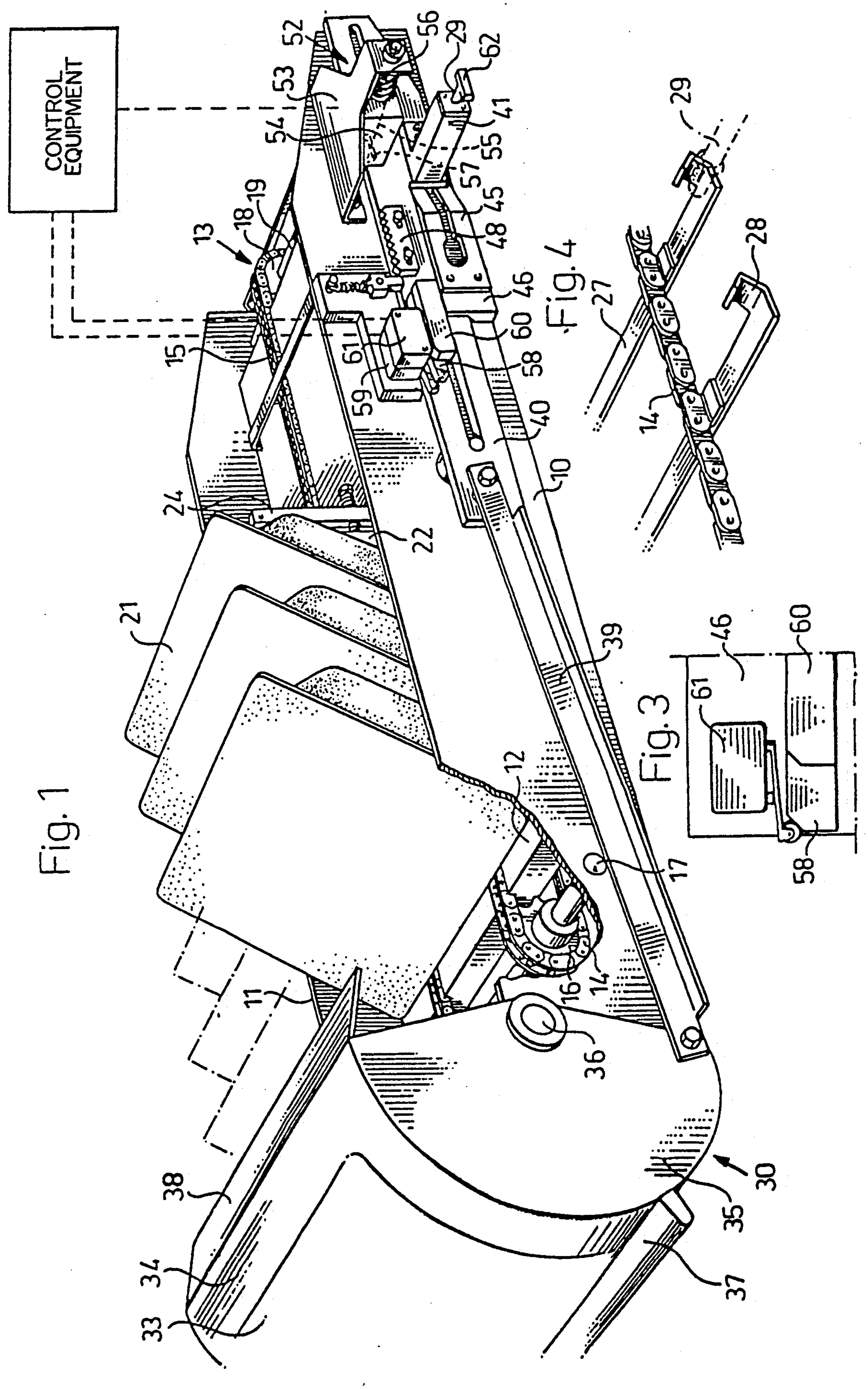

CONTROL EQUIPMENT 10
11
12
13
14
15
16
17
18
19
21
22
24
27
28
29
30
33
34
35
36
37
38
39
40
41
45
46
48
52
53
54
55
56
57
58
59
60
61
62

ARTICLE CASSETTE FOR A VENDING MACHINE

The present invention relates to an article cassette for a vending machine, said cassette being of the kind comprising an elongate approximately horizontal conveyor which is arranged to support a plurality of articles in a row, one after the other, in a storage space located behind an outfeed station, and to feed said articles step by step towards said outfeed station while successively transferring the foremost article in said row from the storage space to the outfeed station, which has, at its front end, an access opening provided with a cover mounted for manual rotation around a transverse horizontal axis and movable between, on the one hand a closed position, in which it may be releasably locked and in which it closes said opening, and, on the other hand an open position, in which it uncovers the access opening and permits an article located in the outfeed station to be taken out through said opening, screen means being provided for keeping the storage space screened off from the outfeed station and preventing access to said space from the access opening via the outfeed station when said opening is uncovered.

An article cassette of said kind is previously known through U.S. Pat. No. 2 561 828. Said patent specification discloses a vending machine which is provided with a plurality of such article cassettes, mounted in a common cabinet-like housing, and which also includes means for holding the interior of said housing at a suitable low temperature.

In this prior vending machine, the screen means by which the storage space of each article cassette may be screened off from the outfeed station of the cassette consist of two separately hinged flaps which are spring-biased in a direction towards their screening positions. In order to prevent the screen flaps from being manually opened when the access opening is uncovered, separate spring-biased blocking means are provided to permit the two flaps to be blocked in their screening positions. In practice, the above construction of the screen means is unfavourable in several respects. Firstly, despite the spring load acting on the screen flaps, said flaps run an evident risk of being wedged in their open positions. Secondly, a cunning customer may very well release the blocking means for the flaps by a suitable tool, which means that the flaps may then be opened manually without hindrance. Moreover, the above described construction of the screen means and the need for separate blocking means for them following from their construction results in a not neglectable increase of the total manufacturing costs for the article cassette.

The invention has for its purpose to provide an improved article cassette of the kind initially specified, which eliminates the above drawbacks of said prior article cassette in a favourable manner.

For the above purpose, according to the invention there is proposed an article cassette primarily characterized in that said screen means comprise a screen member rigidly connected to the cover and arranged to be inserted into the transport path for the articles from the storage space to the outfeed station when the cover is rotated in a direction towards its open position and to be withdrawn from said transport path when the cover is rotated in the opposite direction.

The invention facilitates a substantially simplified and less expensive construction of the screening arrangement while simultaneously making it possible to obtain such an arrangement having a more reliable function.

According to a preferred embodiment of the invention, the cover may comprise a wall member of arc-circular curved shape, the centre of curvature of which coincides with the rotary axis of the cover, said screen member being formed by an extension of said wall member, projecting from an adjacent portion of the latter in a direction at least approximately coincident with the peripheral direction of the wall member.

Moreover, the cassette may preferably include blocking means operatively connected to the cover and adapted, upon rotation of the cover through a predetermined small angle from its open position and towards its closed position, to block the cover against rotation in a direction back to its open position, until it has reached its closed position. These blocking means may preferably be formed by a double-acting blocking device which may also serve, upon rotation of the cover through a predetermined small angle from its closed position and towards its open position, to lock the cover against rotation in a direction back to its closed position, until it has reached its open position.

Such a double-acting blocking devices is especially favourable if, in a manner known per se through the above U.S. patent specification, the cassette comprises a reciprocating driver which is operated by the cover and which is arranged to advance the conveyor one step for each complete rotation of the cover from its open position to its closed position, since, in such a case, the cover may be permanently coupled to the driver to constantly control the position of the latter in dependence upon the instantaneous position of the cover. Hereby it is possible to eliminate the need for a return spring for the driver, existing in the known cassette, and to avoid the drawbacks following from the use of such a spring and consisting above all in an unreliable function and a spring load on the cover being inconvenient to a customer.

Since the article cassette forms part of a vending machine, the cover should be releasably lockable in its closed position. According to the invention, the locking device required for this purpose may suitably consist of an electrically releasable locking device which, when being in its locking state, permits the cover to be rotated from its closed position and towards its open position through a second small angle, less than the angle through which the cover has to be rotated from its closed position and towards its open position to bring the double-acting blocking device to block the cover against rotation back to its closed position. In this case, an electric sensor may be provided to sense an initial rotation of the cover from its closed position towards its open position, occurring while the locking device is in its locking state, and to generate a control signal to an electric control equipment for the locking device, by which the latter may be released.

The abovementioned locking device may preferably comprise an electromagnet having an armature serving as a movable locking bolt and spring-biased in a direction towards a striking plate which is connected to the cover for constrained movement by the latter in a plane perpendicular to the direction of movement of the armature and which is provided with a recess, in which the armature may be received with a small free clearance when the cover is in its closed position.

Figure 2:
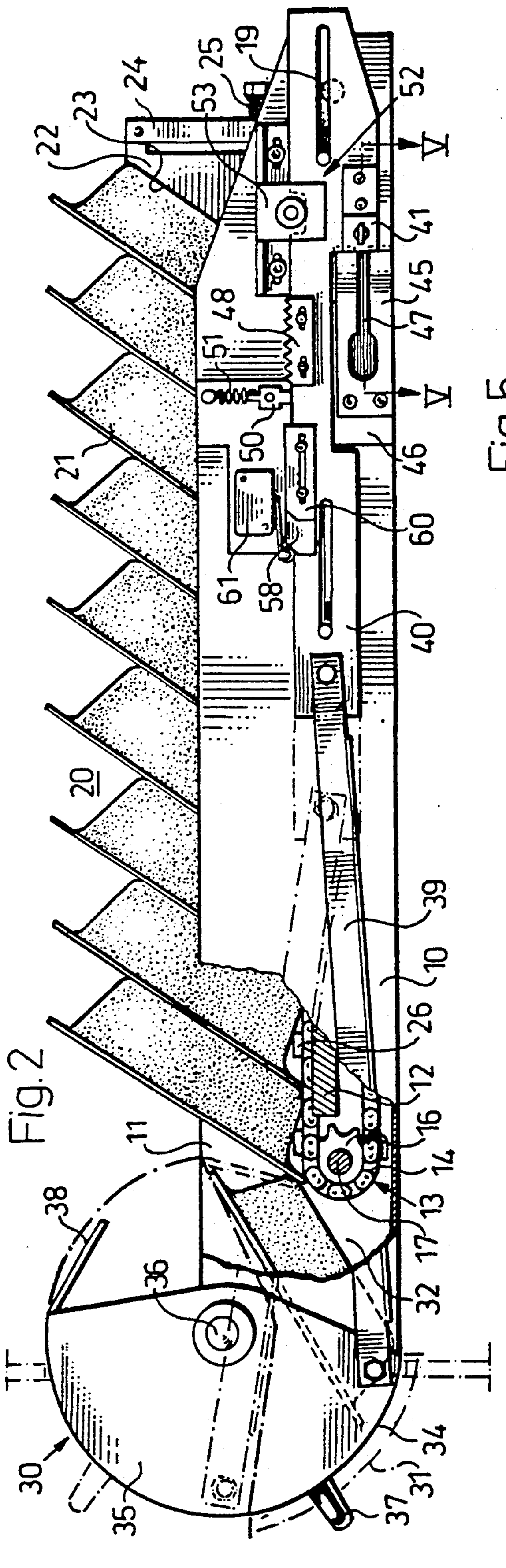
Figure 5:
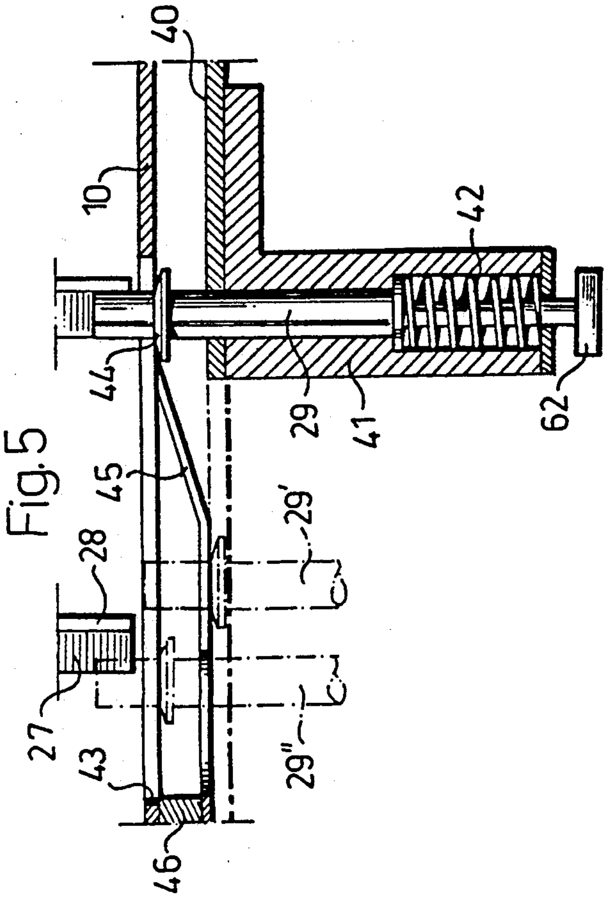
Figure 6:
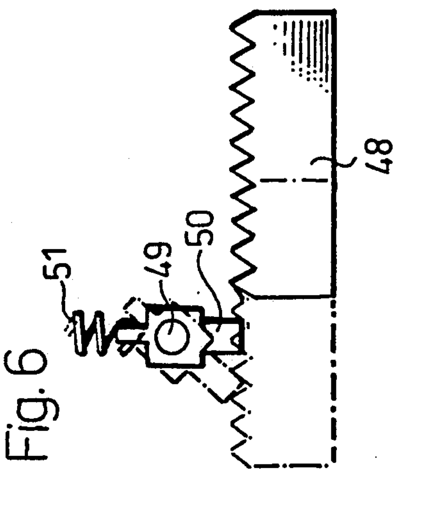

Below the invention will be further described with reference to the accompanying drawings, in which:

FIG. 1 shows a perspective view of an article cassette according to an embodiment of the invention, selected by way of example, FIG. 2 shows a side elevation of said article cassette, FIG. 3 is a partial side elevation showing, on an enlarged scale, portions of two mutually displaced cams which are arranged to cooperate each with one of two microswitches located in front of each other, FIG. 4 is a partial perspective view showing a portion of a chain conveyor of the cassette and means mounted on said conveyor for engagement with a driver by which the conveyor may be advanced in steps, FIG. 5 is a partial plan view, in section taken along line V—V in FIG. 2, showing said driver, and FIG. 6 is a fragmentary view showing a double-acting block device on an enlarged scale.

The article cassette, shown in the drawings, has a body comprising two parallel longitudinally extending vertical side walls 10 and 11 and an intermediate longitudinally extending horizontal plate 12 which forms a spacing means between the two side walls, to which the latter are secured by means of screws, not shown in the drawings. At their lower ends, the two side walls 10 and 11 are provided with inwardly bent horizontal bottom flanges by which the cassette may be mounted on suitable supporting means of a cabinet unit of a vending machine. Said cabinet unit may be provided with a plurality of article cassettes of the illustrated construction which may be mounted in one or more horizontal rows and in one or more vertical columns in said cabinet unit.

Between the two side walls 10 and 11, there is provided a horizontal chain conveyor, generally designated 13. Said conveyor consists of two parallel chains 14 and 15 which extend with an upper and a lower part between one pair of front chain wheels 16, mounted on a transverse front shaft 17 journalled in the two side walls 10, 11, and one pair of rear chain wheels 18, mounted on a transverse rear shaft 19. The upper parts of the two chains 14, 15 are partially received each in one longitudinally extending guide groove in the upper side of plate 12.

The conveyor 13 has for its purpose to support a plurality of articles 21 in a row, one after the other, in a storage space 20 of the cassette located above said conveyor. In the drawings, these articles have been shown to consist of approximately rectangular packages which, for instance, may contain frozen food packed in portions. In this case, the cabinet unit in which the cassette is mounted should be provided with a freezer in order to make it possible to maintain a suitable low temperature within said cabinet unit.

In order to support the rearmost article 21 in the illustrated inclined position, there is provided a wedge-shaped support member 22 having an inclined front support surface 23. At its upper narrow end, said support member 22 is pivotally connected to a rear plate 24 which is spring-biased in a direction towards support member 23 by means of one or more springs 25. At their one ends, the two chains 14 and 15 are anchored to a lower portion of support member 23, while at the other ends they are anchored to a lower portion of plate 24. Hereby support member 23 and plate 24 will act both as a chain tensioner for the two chains and as a support means for the rearmost article 21 which may be displaced along the upper side of plate 12 by means of the chains.

In order to keep the articles 21 resting on conveyor 13 in their illustrated inclined positions and prevent them from sliding down to a horizontal position, chains 14 and 15 are provided with a number of equally spaced transverse stop rails 28 (FIG. 2), located in front of support member 23. Additionally, along their lower parts, located below plate 12 in FIG. 2, chains 14 and 15 are provided with a number of correspondingly spaced transversally extending connection rails 27 which at their ends located closest to side wall 10 are provided with hook-shaped engagement means 28 (FIGS. 4 and 5) for a driver 29, by which conveyor 13 may be advanced in steps in a manner described more in detail below.

At its front end, located to the left in FIGS. 1 and 2, the cassette is provided with a cover, generally designated 30, by means of which one may uncover and close an access opening 31 which leads to an outfeed station 32, located in front of conveyor 13, and which has been illustrated by a dash-dotted arc line in FIG. 2. Each time conveyor 13 is advanced one step, the article 21 previously located foremost in storage space 20 will be transferred to said outfeed station.

Cover 30 consists of a transverse front wall 34 of arc-circular curved shape, which is provided with an inspection window 33, and two end walls 35 located at opposite sides of said front wall. Each of these two end walls is provided with a pivot pin 36 by which the cover is rotatably journalled in the two side walls 10 and 11 for rotation relatively to said walls around a transverse horizontal axis. Below window 33, the cover is provided with a manual operating handle 37. Furthermore, at its upper end, it is provided with a screen member 38 formed as an extension of front wall 34 and projecting from said wall in a direction at least approximately coincident with the peripheral direction of said wall. This screen member serves to keep the outfeed station 32 screened off from storage space 20 when opening 31 is uncovered. For this purpose, screen member 38 is arranged to be inserted into the transport path for articles 21 from storage space 20 to outfeed station 32 when cover 30 is rotated from its closed position, shown in full lines in FIG. 2 and in which it covers opening 31, and to its open position, illustrated in dash-dotted lines and in which it uncovers said opening.

However, cover 30 also has for its purpose to serve as a manual operating means for conveyor 13 by which the latter may be advanced in steps through the intermediary of driver 29. For this purpose, at its lower edge, cover 30 is pivotally connected to one end of a link 39 which acts as a connecting rod and has its other end pivotally connected to a flat slide 40, mounted longitudinally displaceable on side wall 10 and serving as a carrier for driver 29.

As may best be seen from FIG. 5, driver 29 is formed by a short cylindrical rod which is mounted for axial displacement in a horizontal direction, perpendicular to said slide 40, in a housing 41 secured to said slide. By means of a spring 42, said driver rod is biased in a direction towards a position in which it projects through an elongate opening 43 in side wall 10 and into the movement path of the previously mentioned engagement means 28 of conveyor 13 which are intended to cooperate with the driver. When the cover 30 is in its closed position, driver 29 assumes the position shown in full lines in FIG. 5.

When cover 30 is opened, slide 40 and hence also driver 29 are moved in a direction to the left according to FIGS. 2 and 5. The driver is simultaneously axially displaced in an outward direction away from the movement path of engagement means 28 through the action of a peripheral flange 44, provided near the inner end of the driver and adapted to cooperate with a comparatively stiff leaf spring 45 which serves as a cam means and is mounted on a mounting plate 46 secured to the adjacent side wall.

As may best be seen from FIG. 2, said leaf spring 45 is provided with a longitudinal slot 47, extending along the major portion of the length of said spring. While the longer right hand portion of slot 47 has a width permitting free passage only for the small diameter end portion of driver rod 29, a shorter left hand portion of said slot has a substantially larger width exceeding the diameter of flange 44. This means that when driver 29, after having passed the axially lifted intermediate position 29′ shown in dash-dotted lines, reaches the wider portion of slot 47, it may again move in an axial inward direction, and, more precisely, to the position designated 29″. During this movement, the driver passes the engagement means 28 located to the left in FIG. 5. Preferably, the arrangement may be such that, upon reaching position 29″, the driver will move a short additional length to the left before the cover reaches its final open position.

When the article 21 located in outfeed station 32 has been taken out from said station and cover 30 is again closed, slide 40 and driver 29, carried thereby, are moved to the right according to FIGS. 2 and 5. Initially, the driver will now move freely in a direction towards the adjacent engagement means 28 without actuating said means and conveyor 13. Thus, not until cover 30 has been rotated through a considerable angle, driver 29 will strike said engagement means 28 and then force said means to move in unison with the driver during the reminder of the closing movement of the cover, thereby advancing conveyor 13 one step. When flange 44 reaches the right hand end portion of spring 45 resting against side wall 10, it will lift said end portion resiliently away from wall 10, so that it may pass said spring portion unobstructedly and again reach the starting position shown in full lines in FIG. 5.

Reference numeral 48 designates a toothed rack mounted on slide 40 and cooperating with a pawl 50 pivotally mounted on side wall 10 by means of a pivot pin 49, said pawl being normally held in the vertical position shown in full lines in FIG. 6 by means of a spring 51. Rack 48 and pawl 50 together form a double-acting blocking device which, as soon as cover 30 has been rotated through a predetermined small angle from its closed position towards its open position, or from its open position towards its closed position, blocks the cover against rotation in a direction back to its starting position until it has reached the opposite position towards which the initial rotary movement has taken place. In FIG. 6, rack 48 and pawl 50 have been shown in dash-dotted lines in a blocking state in which the pawl blocks the rack against movement in a direction to the right during a current movement of the rack in a direction to the left.

In order to lock slide 40 and cover 30 in their positions shown in FIGS. 1 and 2, there is provided an electric locking device, generally designated 52, which is mounted on a bracket 53 secured to side wall 10. This locking device comprises an electromagnet 54 provided with an armature 55 which, by means of a spring 56, is biased in a direction towards slide 40 to lock the latter through engagement with a recess 57 in said slide. Armature 55 thus acts as a locking bolt which is adapted to be brought into engagement with a striking plate, formed by slide 40, which is displaceable relatively to said locking bolt in a direction perpendicular to said bolt.

Armature 55 is received with a small free clearance in recess 57. The purpose of this clearance is to make it possible to rotate the cover 30 through a small angle from its closed position and towards its open position before the armature locks the cover against continued rotation in said direction through engagement with an edge of recess 57. The admitted free relative movement between slide 40 and armature 55 is selected so as to permit an inner cam 58, mounted on the slide, to actuate a cooperating inner microswitch 59, mounted on mounting plate 46, before further such movement is stopped. This switch 59 serves to sense the initial opening movement of cover 30 and to generate a control signal to an electrical control equipment connected to the payment system of the vending machine. Provided that an acceptable payment has been made and that the covers of all other article cassettes are in their closed positions, said control equipment will energize electromagnet 54 and cause armature 55 to be attracted and withdrawn from its engagement with slide 40.

Cover 30 may then be further rotated in a direction towards its open position. Upon a short continued rotation of cover 30 in said direction, an outer cam 60, mounted on slide 40 in a longitudinally displaced position relatively to cam 58, will actuate an outer switch 61, located in front of switch 59. Said switch 61 interrupts the energization of electromagnet 54, which means that spring 56 will move armature 55 in an axial inward direction into resilient contact against the outer side of slide 40. However, armature 55 cannot lock slide 40 until recess 57 has again been brought into a position in front of the armature. During the interval between the actuation of switch 59 and the actuation of switch 61, the blocking device has become operative. For this reason, slide 40 cannot be returned to its starting position until cover 30 has been rotated to its open position and then back to its closed position. Shortly before cover 30 reaches its closed position, switch 59 is released by cam 58. At this moment, the electric control equipment resets the vending machine to its normal readiness state and actuates the payment system to bring said system to effect any required small-change repayment or similar operation.

In order to facilitate a simple and rapid manual movement of support member 23 back to its inner end position shown in FIG. 2 when the cassette is to be loaded with new articles 21, driver 29 is provided with a handle 62 located outside housing 41. By means of this handle, the service personnel may manually withdraw the driver from the movement path of engagement means 28 in order hereby to release conveyor 13.

The invention is not restricted to the embodiment above described and shown in the drawings. Instead, many modifications are feasible within the scope of the invention.

I claim:

1. An article cassette for a vending machine, said cassette being of the kind comprising an elongate approximately horizontal conveyor (13) which is arranged to support a plurality of articles (21) in a row, one after the other, in a storage space (20) located behind a stationary outfeed station (32), and to feed said articles (21)

step by step towards said outfeed station (32) while successively transferring the foremost article (21) in said row from the storage space (20) to the outfeed station (32) through a transfer passage between the conveyor and the outfeed station, an access opening defining a front end of the outfeed station,(31) a cover (30) for the access opening mounted for manual rotation around a transverse horizontal axis (36) and movable between, on the one hand a closed position, in which the cover closes said opening, and, on the other hand an open position, in which the cover uncovers the access opening (31) and provides access to the outfeed station (32) enabling an article located in the outfeed station to be removed through said access opening, screen means (38) being provided for keeping the storage space (20) screened off from the outfeed station (32) and preventing access to said spaced from the access opening (31) via the outfeed station (32) when said opening (31) is uncovered, characterized in that said screen means comprise a screen member (38) rigidly connected to the cover (30) and arranged to be inserted into the transfer passage when the cover (30) is rotated in a direction towards its open position and to be withdrawn from the transfer passage when the cover (30) is rotated in the opposite direction.

2. An article cassette according to claim 1, characterized in that the cover (30) comprises a wall member (34) of arc-circular curved shape, the center of curvature of which coincides with said axis (36) of the cover (30), said screen member (38) being formed by an extension of said wall member (34) projecting from the latter in a direction being at least approximately coincident with the peripheral direction of the wall member (34).

3. An article cassette according to claim 1 further including blocking means (48–51) operatively connected to the cover (30) and arranged, upon rotation of the cover (30) through a predetermined small angel from its open position and towards its closed position, to block the cover (30) against rotation in a direction back to its open position unit it has reached its closed position.

4. An article cassette according to claim 3, characterized in that said blocking means are formed by a double-acting blocking device (48–51), which is also arranged, upon rotation of the cover (30) through a predetermined small angle from its closed position and towards its open position, to block the cover (30) against rotation in a direction back to its closed position, until it has reached its open position.

5. An article cassette according to claim 4, comprising a reciprocating driver (29) which is operated by the cover (30) and arranged to advance the conveyor (13) one step for each complete rotation of the cover (30) from its open position to its closed position, characterized in that the cover (30) is permanently coupled to said driver (29) for constantly controlling the position of the latter in dependence upon the instantaneous position of the cover (30).

6. An article cassette according to claim 4, characterized in that the cover (30) is lockable in its closed position by means of an electrically releasable locking device (52) which, when being in its locking state, permits the cover (30) to be rotated from its closed position and towards its open position through a second small angle, less than the angle through which the cover (30) has to be rotated from its closed position and towards its open position to bring the blocking device (48–51) to block the cover (30) against rotation back to its closed position, an electric sensor (59) being arranged to sense an initial rotation of the cover (30) from its closed position towards its open position, occurring while the locking device (52) is in its locking state, and then to generate a control signal to an electric control equipment for the locking device (52), by which the latter may be released.

7. An article cassette according to claim 6, characterized in that the locking device (52) comprises an electromagnet (54) having an armature (55) serving as a movable locking bolt and spring-biased in a direction towards a striking plate (40) which is connected to the cover (30) for constrained movement by the latter in a plane perpendicular to the direction of movement of the armature (55) and which is provided with a recess (57), in which the armature (55) may be received with a small free clearance when the cover (30) is in its closed position.

8. An article cassette for a vending machine, said cassette being of the kind comprising an elongate approximately horizontal conveyor which is arranged to support a plurality of articles in a row, one after the other, in a storage space located behind a stationary outfeed station, and to feed said articles step by step towards said outfeed station while successively transferring the foremost article in said row from the storage space to the outfeed station through a transfer passage between the conveyor and the outfeed station, an access opening defining a front-end of the outfeed station, a cover for the access opening mounted for manual rotation around a transverse horizontal axis and movable between, on the one hand a closed position in which the cover closes said opening, and, on the other hand an open position, in which the cover uncovers the access opening and provides access to the outfeed station enabling an article located in the outfeed station to be removed through said access opening, screen means being provided for keeping the storage space screened off from the outfeed station and preventing access to said space from the access opening via the outfeed station when said opening is uncovered, characterized in that said screen means comprise a screen member rigidly connected to the cover and arranged to be inserted into the transfer passage when the cover is rotated in the direction towards its open position and to be withdrawn from the transfer passage when the cover is rotated in the opposite direction, the cassette further including blocking means operatively connected to the cover and arranged, upon rotation of the cover through a pre-determined small angle from its open position and towards its closed position, to block the cover against rotation in a direction back to its open position until it has reached its closed position, characterized in that said blocking means are formed by a double-acting blocking device, which is also arranged, upon rotation of the cover through a predetermined small angle from its closed position and towards its open position, to block the cover against rotation in a direction back to its closed position, until it has reached its open position, further characterized in that the cover is lockable in its closed position by means of an electrically releasable locking device which, when being in its locking state, permits the cover to be rotated from its closed position and towards its open position through a second small angle, less than the angle through which the cover has to be rotated from its closed position and towards its open position and towards its open position to bring the blocking device to block the cover against rotation back to its closed position, an electric sensor being arranged to sense an initial rotation of the cover from its closed position towards its open position, occurring while the locking device is in its locking state, and then to generate a control signal to an electric control equipment for the locking device, by which the latter may be released.

9. An article cassette according to claim 8, characterized in that the locking device comprises an electromagnet having an armature serving as a movable locking bolt and spring-biased in a direction towards a striking plate which is connected to the cover for constrained movement by the latter in a plane perpendicular to the direction of movement of the armature and which is provided with a recess, in which the armature may be received with a small free clearance when the cover is in its closed position.

10. An article cassette for a vending machine, said cassette being of the kind comprising an elongate approximately horizontal conveyor which is arranged to support a plurality of articles in a row, one after the other, in a storage space located behind a stationary outfeed station, and to feed said articles step by step towards said outfeed station while successively transferring the foremost article in said row from the storage space to the outfeed station through a transfer passage between the conveyor and the outfeed station, an access opening defining a frontend of the outfeed station, a cover for the access opening mounted for manual rotation around a transverse horizontal axis and movable between, on the one hand a closed position in which the cover closes said opening, and, on the otherhand an open position, in which the cover uncovers the access opening and provides access to the outfeed station enabling an article located in the outfeed station to be removed through said access opening, screen means being provided for keeping the storage space screened off from the outfeed station and preventing access to said space from the access opening via the outfeed station when said opening is uncovered, characterized in that said screen means comprise a screen member rigidly connected to the cover and arranged to be inserted into the transfer passage when the cover is rotated in the direction towards its opened position and to be withdrawn from the transfer passage when the cover is rotated in the opposite direction, the cassette further including blocking means operatively connected to the cover and arranged, upon rotation of the cover through a pre-determined small angle from its open position and towards its closed position, to block the cover against rotation in a direction back to its open position until it has reached its closed position, characterized in that said blocking means are formed by a double-acting blocking device, which is also arranged, upon rotation of the cover through a predetermined small angle from its closed position and towards its open position, to block the cover against rotation in a direction back to its closed position, until it has reached its open position, and further comprising a reciprocating driver which is operated by the cover and arranged to advance the conveyor one step for each complete rotation of the cover from its open position to its closed position, characterized in that the cover is permanently coupled to said driver for constantly controlling the position of the latter in dependence upon the instantaneous position of the cover.

* * * * *